United States Patent
Steynberg

(10) Patent No.: US 6,864,293 B2
(45) Date of Patent: Mar. 8, 2005

(54) PRODUCTION OF LIQUID AND, OPTIONALLY, GASEOUS PRODUCTS FROM GASEOUS REACTANTS

(75) Inventor: André Peter Steynberg, Vanderbijlpark (ZA)

(73) Assignee: Sasol Technology (Proprietary) Limited, Johannesburg (ZA)

(*) Notice: Subject to any disclaimer, the term of this patent is extended or adjusted under 35 U.S.C. 154(b) by 51 days.

(21) Appl. No.: 10/322,835

(22) Filed: Dec. 18, 2002

(65) Prior Publication Data

US 2003/0125395 A1 Jul. 3, 2003

Related U.S. Application Data

(60) Provisional application No. 60/342,668, filed on Dec. 20, 2001.

(30) Foreign Application Priority Data

Dec. 20, 2001 (ZA) .............................. 2001/10471

(51) Int. Cl.[7] .............................................. C07C 27/00
(52) U.S. Cl. ........................................................ 518/719
(58) Field of Search ......................................... 518/712

(56) References Cited

U.S. PATENT DOCUMENTS

| | | | |
|---|---|---|---|
| 4,258,006 A | | 3/1981 | Flockenhaus et al. ........ 422/146 |
| 4,407,974 A | * | 10/1983 | Flockenhaus et al. ....... 518/711 |
| 4,539,016 A | | 9/1985 | Flockenhaus et al. |
| 5,409,960 A | | 4/1995 | Stark ........................ 518/700 |
| 5,527,473 A | * | 6/1996 | Ackerman ................... 210/767 |

FOREIGN PATENT DOCUMENTS

| | | | | |
|---|---|---|---|---|
| DE | 2807422 | 8/1979 | ............ | C10K/3/00 |
| EP | 0099690 | 7/1983 | ............ | C10G/3/00 |
| GB | 2193444 | 2/1988 | ............ | B01J/12/00 |
| WO | WO 0045948 | 8/2000 | ............ | B01J/8/22 |
| WO | WO 0136066 | 5/2001 | ............ | B01D/3/00 |

OTHER PUBLICATIONS

Great Britain Search Report corresponding to GB 0229203.5 completed May 21, 2003.

* cited by examiner

Primary Examiner—J. Parsa
(74) Attorney, Agent, or Firm—Myers Bigel Sibley & Sajovec, P.A.

(57) ABSTRACT

A process for producing liquid and, optionally, gaseous products from gaseous reactants includes feeding, at a low level, gaseous reactants into a slurry bed, allowing the gaseous reactants to react as they pass upwardly through the slurry bed, withdrawing any gaseous product and unreacted gaseous reactants from a head space above the slurry bed and withdrawing liquid product and/or slurry bed to maintain the slurry bed at a desired level. The process further includes passing boiler water, as a first heat transfer fluid, in indirect heat exchange relationship through the slurry bed to remove heat from the slurry bed, allowing the heated boiler water to flash and separate to form pressurised steam, controlling the pressure of the steam to be substantially constant, and passing a second heat transfer fluid in indirect heat exchange relationship through the slurry bed to remove heat from the slurry bed.

8 Claims, 2 Drawing Sheets

PRODUCTION OF LIQUID AND, OPTIONALLY, GASEOUS PRODUCTS FROM GASEOUS REACTANTS

CROSS-REFERENCE TO RELATED APPLICATIONS

This application claims priority from U.S. Provisional Application No. 60/342,668, filed Dec. 20, 2001 and under 35 U.S.C. § 371 from South African Patent Application No. 2001/10471, filed in English on Dec. 20, 2001, the disclosures of which are incorporated by reference herein in their entirety.

BACKGROUND OF THE INVENTION

THIS INVENTION relates to the production of liquid and, optionally, gaseous products from gaseous reactants. In particular, it relates to a process for producing liquid and, optionally, gaseous products from gaseous reactants, and to an installation for producing liquid and, optionally, gaseous products from gaseous reactants.

Many reactions, such as the Fischer-Tropsch synthesis reaction are highly exothermic and the effective design of a heat removal system is essential to control the reaction for industrial applications. This is also the case for the Fischer-Tropsch slurry phase reaction. Typically, heat removal is effected by passing boiler water through cooling pipes submerged in a slurry bed within which the Fischer-Tropsch synthesis reaction takes place. The boiling water is pumped from a steam drum through the cooling pipes and the heated water is then returned to the steam drum where it flashes to form steam. The steam passes out of the steam drum via a pressure control valve to a steam header. Often, the amount of steam generated is in excess of total requirements, but not enough high pressure steam is produced.

In the prior art of which the applicant is aware, the heat removal rate is matched with the heat generation rate of the Fischer-Tropsch synthesis reaction by varying the pressure in the steam drum. As will be appreciated by those skilled in the art, pressure changes in the steam drum changes the boiling temperature of the water in the cooling system and hence it changes the temperature of the water and steam in the cooling pipes in contact with the slurry bed, and the heat removal rate.

A disadvantage of the prior art heat removal system is that a sudden increase in heat generation in the slurry bed may cause operating problems, since a sudden increase in heat generation may cause a sudden drop in pressure in the steam drum, which may result in cavitation of the pumps that deliver the boiler water to the cooling pipes. This may result in a failure of the cooling system, leading to overheating of the slurry bed and thus damaging the catalyst in the slurry bed.

It is an object of this invention to provide a process and installation for producing liquid and, optionally, gaseous products from gaseous reactants, in which the temperature control of the slurry bed is improved and which can provide more optimum steam production.

According to one aspect of the invention, there is provided a process for producing liquid and, optionally, gaseous products from gaseous reactants, which process includes feeding, at a low level, gaseous reactants into a slurry bed of solid particles suspended in a suspension liquid;

allowing the gaseous reactants to react as they pass upwardly through the slurry bed, thereby to form liquid and, optionally, gaseous products;

withdrawing any gaseous product and unreacted gaseous reactants from a head space above the slurry bed;

withdrawing liquid product and/or slurry from the slurry bed to maintain the slurry bed at a desired level;

passing boiler water, as a first heat transfer fluid, in indirect heat exchange relationship through the slurry bed to remove heat from the slurry bed;

allowing the heated boiler water to flash and separate to form pressurised steam;

controlling the pressure of the steam to be substantially constant; and passing a second heat transfer fluid in indirect heat exchange relationship through the slurry bed to remove heat from the slurry bed.

The first heat transfer fluid, which is boiler water, may remove at least 50%, preferably at least 75%, of the total heat removed from the slurry bed by the first and second heat transfer fluids.

The average temperature of the second heat transfer fluid in indirect heat exchange relationship with the slurry bed may be lower than the average temperature of the boiler water in indirect heat exchange relationship with the slurry bed.

The pressure of the steam may be controlled at at least 14 bar(g), preferably at least 16 bar(g).

The process may include cooling the second heat transfer fluid and returning it for heat exchange duty to the slurry bed. In other words, the second heat transfer fluid may be cycled continuously through the slurry bed, in a substantially closed system.

The cooling of the second heat transfer fluid may be effected by means of indirect heat exchange with a cooling fluid, e.g. air.

The process may include controlling the temperature of the slurry bed by controlling an operating temperature of the second heat transfer fluid passing in indirect heat exchange relationship through the slurry bed.

The second heat transfer fluid may be water. The process may include pumping the water to a pressure sufficient substantially to prevent evaporation of the water to form steam at the operating temperature and pressure of the water. Thus, the water may be pumped to a pressure of at least 28 bar(g), preferably at least 34 bar(g), e.g. about 40 bar(g).

Instead, the process may include allowing steam to be formed by the second heat transfer fluid. In this case, the water may be pumped to a pressure of between about 2 bar(g) and about 12 bar(g), preferably between about 4 bar(g) and about 10 bar(g).

The process may include selectively increasing a heat transfer surface area between the second heat transfer fluid and the slurry bed, and decreasing a heat transfer surface area between the first heat transfer fluid and the slurry bed, in order to increase the total heat removal rate achieved by the first and second heat transfer fluids. Instead, or in addition, the process may include selectively decreasing a heat transfer surface area between the second heat transfer fluid and the slurry bed, and increasing a heat transfer surface area between the first heat transfer fluid and the slurry bed in order to decrease the total heat removal rate achieved by the first and second heat transfer fluids. This may be effected by switching heat transfer surface area in contact with the first heat transfer fluid and the slurry bed to be in contact with the second heat transfer fluid and the slurry bed, and/or vice versa.

The solid particles may be catalyst particles for catalysing the reaction of the gaseous reactants into the liquid product, and, when applicable, the gaseous product. The suspension liquid may be the liquid product, with the slurry bed being contained in a reaction zone of a slurry reactor or bubble column using a three-phase system comprising solid catalyst particles, liquid product, and gaseous reactants and, optionally, product.

The gaseous reactants may be capable of reacting catalytically in the slurry bed to form liquid hydrocarbon product and gaseous hydrocarbon product by means of Fischer-Tropsch synthesis, with the gaseous reactants being in the form of a synthesis gas stream comprising mainly carbon monoxide and hydrogen.

The catalyst may be an iron based Fischer-Tropsch catalyst or a cobalt based Fischer-Tropsch catalyst. Typically, the catalyst particles have a particle size range such that no catalyst particles are greater than 300 microns and less than 5% by mass of the catalyst particles are smaller than 22 microns.

The process may include allowing slurry to pass downwardly from a high level in the slurry bed to a lower level thereof, through at least one downcomer located in a first downcomer region of the slurry bed, as well as through at least one further downcomer located in a second downcomer region of the slurry bed, with the second downcomer region being spaced vertically with respect to the first downcomer region, thereby to redistribute solid particles within the slurry bed, as disclosed in International Application No. WO 99/03574, the specification of which is incorporated herein by reference.

According to another aspect of the invention, there is provided an installation for producing liquid and, optionally, gaseous products from gaseous reactants, the installation including a reactor vessel having a slurry bed zone which, in use, will contain a slurry bed of solid particles suspended in a suspension liquid;

a gas inlet in the vessel at a low elevation within the slurry bed zone, for introducing gaseous reactants into the vessel;

a gas outlet in the vessel above the slurry bed zone, for withdrawing unreacted gaseous reactants and, when present, gaseous product from the vessel;

a liquid outlet in the vessel within the slurry bed zone, for withdrawing liquid product from the vessel;

a first, steam-producing, cooling arrangement for bringing boiler water in indirect heat exchange relationship with the slurry bed zone, the first cooling arrangement including pressure control means for providing steam from the first cooling arrangement at a substantially constant pressure; and a second cooling arrangement for bringing a heat transfer fluid in indirect heat exchange relationship with the slurry bed zone.

The first cooling arrangement may include a steam drum and a steam header. The pressure control means may be configured or configurable to control the pressure in the steam header at a preselected set point.

The second cooling arrangement may be a steam producing cooling arrangement for producing steam at a lower pressure than the first cooling arrangement. The second cooling arrangement may thus include a steam drum.

The second cooling arrangement may be a closed cooling circuit which comprises an indirect heat exchanger for cooling the heat transfer fluid by means of exchange of heat with a cooling medium. The indirect heat exchanger may be an air cooler for cooling the heat transfer fluid with air.

When the second cooling arrangement is a steam producing cooling arrangement and is a closed cooling circuit, it may include a condensate collecting drum in flow communication with the indirect heat exchanger for collecting condensate from the indirect heat exchanger.

The installation may include temperature control means for controlling the temperature of the slurry bed, in use. The temperature control means may be configured to control the slurry bed temperature by controlling an operating temperature of the heat transfer fluid in the second cooling arrangement.

The first cooling arrangement and the second cooling arrangement may be in selective flow communication with each other, to allow at least a portion of the first cooling arrangement selectively to carry heat transfer fluid from the second cooling arrangement, in indirect heat exchange relationship with the slurry bed zone, and/or vice versa.

The first cooling arrangement may have a pressure rating high enough to require the use of schedule 40 piping and 300 lb flanges.

When the second cooling arrangement is not a steam producing cooling arrangement, it may have a pressure rating high enough to require the use of schedule 80 piping and 600 lb flanges.

SUMMARY OF THE INVENTION

When the second cooling arrangement is a steam producing cooling arrangement, it may have a pressure rating compatible with the use of piping with a schedule less than 40 and with 150 lb flanges.

The installation may include at least one downcomer located in a first downcomer region in the slurry bed zone and through which, in use, slurry can pass downwardly and at least one further downcomer located in a second downcomer region in the slurry bed zone, with the second downcomer region being spaced vertically relative to the first downcomer region, the slurry, in use, also passing downwardly through this downcomer, as disclosed in WO 99/03574.

BRIEF DESCRIPTION OF THE DRAWING

The invention will now be described, by way of example, with reference to the accompanying diagrammatic drawings in which.

DETAILED DESCRIPTION OF THE INVENTION

Figure 1:
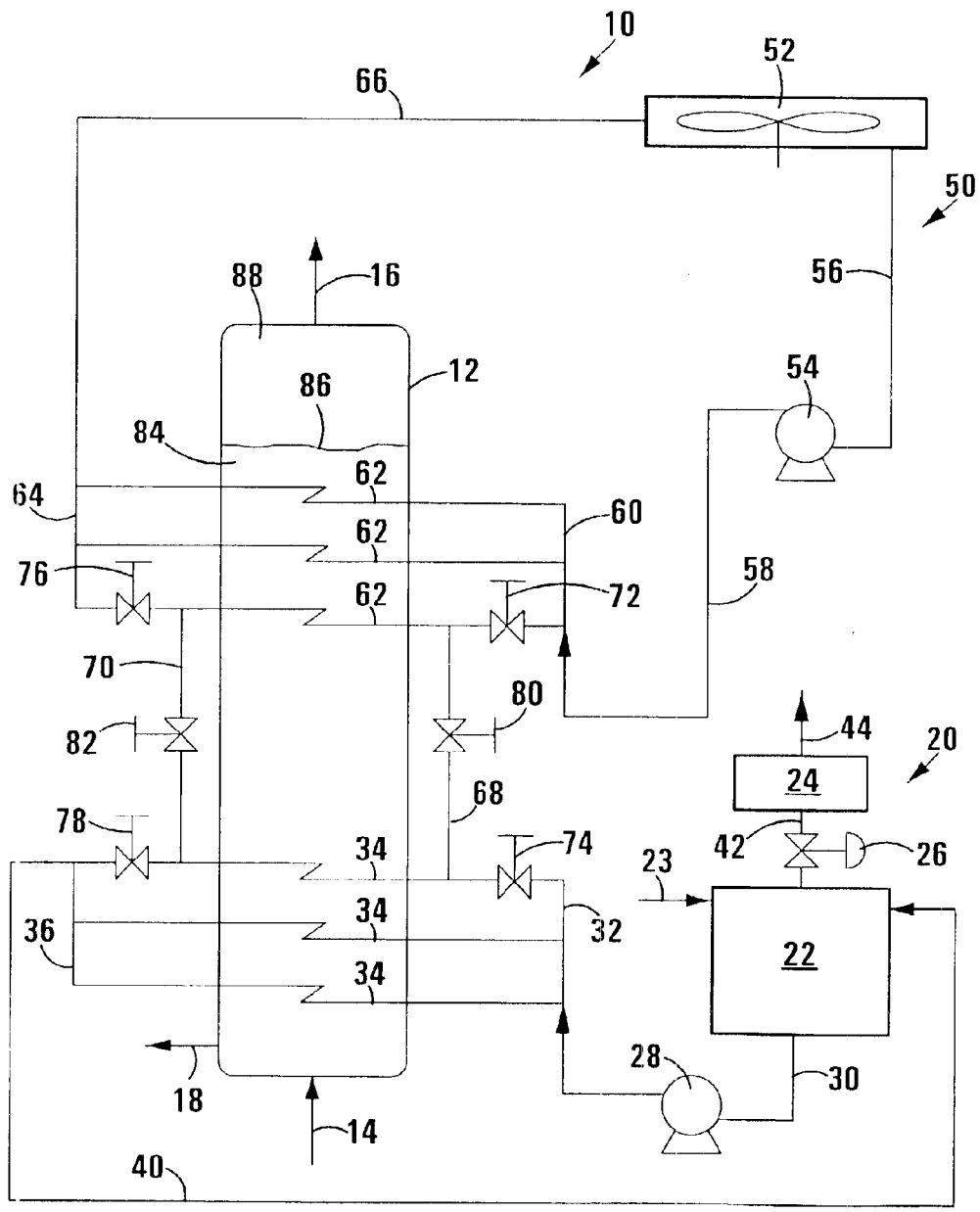
FIG. 1 shows schematically one embodiment of an installation in accordance with the invention for producing liquid and, optionally, gaseous products from gaseous reactants.

Referring to FIG. 1 of the drawings, reference numeral 10 generally indicates an installation according to the invention for producing liquid and, optionally, gaseous products from gaseous reactants.

The installation 10 includes an upright cylindrical slurry reactor or bubble column 12, with a gas inlet 14 leading into a gas distributor (not shown) inside the reactor and a gas outlet 16 leading from the top of the reactor. Liquid product outlets 18, only one of which is shown, lead from the reactor 12 at any convenient level. The installation 10 includes a first, steam-producing cooling arrangement generally indicated by reference numeral 20. The first cooling arrangement 20 includes a steam drum 22, a steam header 24, a pressure control valve 26 and a boiler water circulation pump 28. A boiler water line 30 leads from the steam drum 22 through the boiler water circulation pump 28 into a manifold 32, which may be inside and/or outside the reactor 12. A plurality of cooling pipes 34 leads from the manifold 32 into and through the reactor 12 and into a manifold 36, which may be inside and/or outside the reactor 12. A return line 40 leads from the manifold 36 back to the steam drum 22.

The pressure control valve 26 is located in a steam line 42 which connects the steam drum 22 to the steam header 24. One or more steam lines 44 lead from the steam header 24 to steam users (not shown).

A second cooling arrangement is generally indicated by reference numeral 50. The second cooling arrangement 50 includes an air cooler 52 and a pump 54. A water line 56 extends between the air cooler 52 and the pump 54. A cooling water line 58 leads from the pump 54 into a manifold 60 which may be inside and/or outside the reactor 12. A plurality of cooling pipes 62 is connected to the manifold 60 and a manifold 64 and extends through the reactor 12. A return line 66 leads from the manifold 64 to the air cooler 52. The manifold 64 may be inside and/or outside the reactor 12.

On an inlet side of the cooling pipes 62 and the cooling pipes 34, a connecting line 68 connects one of the cooling pipes 62 and one or more of the cooling pipes 34. Similarly, on an outlet side of the cooling pipes 62 and the cooling pipes 34, a connecting line 70 also connects the cooling pipe 62 and the cooling pipe 34 connected by the connecting line 68. Valves 72, 74 are provided between the connecting line 68 and the manifolds 60, 32 and valves 76, 78 are provided between the connecting line 70 and the manifolds 64, 36. Furthermore, a valve 80 is located in the connecting line 68 and a valve 82 is located in the connecting line 70. It is to be appreciated that more cooling pipes or groups of cooling pipes 34, 62 may be interconnected in this fashion and that the valves will typically be located outside the reactor 12.

In use, synthesis gas comprising mainly carbon monoxide and hydrogen as gaseous reactants, is fed into the bottom of the reactor 12 through the gas inlet 14, the gas typically being uniformly distributed through a grid plate or sparger system (not shown) inside the reactor. The gaseous reactants pass upwardly through a slurry bed 84 comprising Fischer-Tropsch catalyst particles, typically an iron or cobalt based catalyst, suspended in liquid product. The slurry bed is operated to have a normal level 86 above the cooling coils 62, with a head space 88 being provided above the slurry bed 84. As the synthesis gas bubbles through the slurry bed 84, the gaseous reactants therein react catalytically to form liquid product, which thus forms part of the slurry bed 84. From time to time, or continuously, liquid phase comprising liquid product is withdrawn through the outlet 18, with catalyst particles having been separated from the liquid product in a suitable internal filtration system (not shown). Alternatively, the filtration system may be located externally to the reactor 12, with an additional system (not shown) to return the separated catalyst particles to the reactor 12 then being provided.

Typically, the reactor 12 includes downcomers (not shown) to achieve uniform redistribution of catalyst particles within the slurry bed 84, and also to ensure uniform heat distribution throughout the slurry bed 84, as described in the specification of WO 99/03574.

The Fischer-Tropsch reactions taking place in the slurry bed 84 are highly exothermic and the slurry bed 84 is thus operated at a desired temperature in the range of 210° C. to 260° C. In order to control the temperature of the slurry bed 84 at the desired temperature, heat is removed from the slurry bed 84 by means of the first cooling arrangement 20 and the second cooling arrangement 50.

In the first cooling arrangement 20, boiler water is continuously circulated through the slurry bed 84 by means of the boiler water circulation pump 28 and the cooling pipes 34. In the slurry bed 84, the water inside the cooling pipes 34 is heated by indirect heat exchange and a mixture of water and steam is formed. The water and steam mixture is returned through the return line 40 to the steam drum 22, where the water and steam separate, with the steam passing through the pressure control valve 26 to the steam header 24. Fresh boiler water is added to the first cooling arrangement 20 through a feed line 23.

The pressure control valve 26 is configured to control the pressure in the steam drum 22 in abnormal or transient operating conditions. During normal operation this valve is open so that the steam drum 22 is at substantially the same pressure as the steam header 24, which pressure is typically controlled using conventional means (not shown) at a pressure typically about 16 bar(g). Thus, as will be appreciated, the pressure control valve 26 and the conventional means used to control the pressure in the steam header 24 during normal operation are not used to control the temperature of the slurry bed 84.

In the second cooling arrangement 50, boiler quality water is circulated through the slurry bed 84 in indirect heat exchange by means of the pump 54 and the cooling pipes 62. The operating pressure of the water in the second cooling arrangement 50 is about 40 bar(g), ensuring that steam formation inside the cooling pipes 62 is substantially prevented. The inlet temperature of the water into the cooling pipes 62, i.e. in the manifold 60, is typically at least 100° C.

The water in the cooling pipes 62 is returned through the manifold 64 and the return line 66 to the air cooler 52, at a temperature of typically at most 200° C. In the air cooler 52, the water is cooled by indirect heat exchange with ambient air before the water is returned to the cooling pipes 62.

In order to control the temperature of the slurry bed 84, the temperature of the cooling water inside the cooling pipes 62 is controlled. This may be achieved, for example, by manipulating the operation of the air cooler 52 or by providing a bypass line around the air cooler 52.

If the combined heat duty of the cooling arrangements 20 and 50 becomes particularly large due to a sudden release of heat in the slurry bed 84, boiler water from the second cooling arrangement 50 can be used to replace some of the boiler water in the first cooling arrangement 20 which is in indirect heat exchange relationship with the slurry bed 84. This is achieved by opening the valves 80 and 82 and closing the valves 74 and 78. The valves 72 and 76 will normally be open. Water from the cooling arrangement 50 then passes through one of the cooling pipes 34 of the cooling arrangement 20 before it is returned to the air cooler 52. As will be appreciated, since the operating temperature of the boiler water in the second cooling arrangement 50 is lower than the operating temperature of the boiler water in the first cooling arrangement 20, the combined heat removal capacity of the first and second cooling arrangements 20, 50 is thereby increased.

A large decrease in cooling duty can in similar fashion be catered for by closing the valves 72 and 76, which will normally be open, and opening the valves 80 and 82. The valves 74 and 78 are normally open. In this fashion, boiler water from the first cooling arrangement 20 is circulated through one of the cooling pipes 62 before being returned to the steam drum 22. As the boiler water temperature of the first cooling arrangement 20 is higher than the temperature of the boiler quality water in the second cooling arrangement. 50, such an arrangement will reduce the combined heat removal capacity of the first and second cooling arrangements 20, 50.

Figure 2:
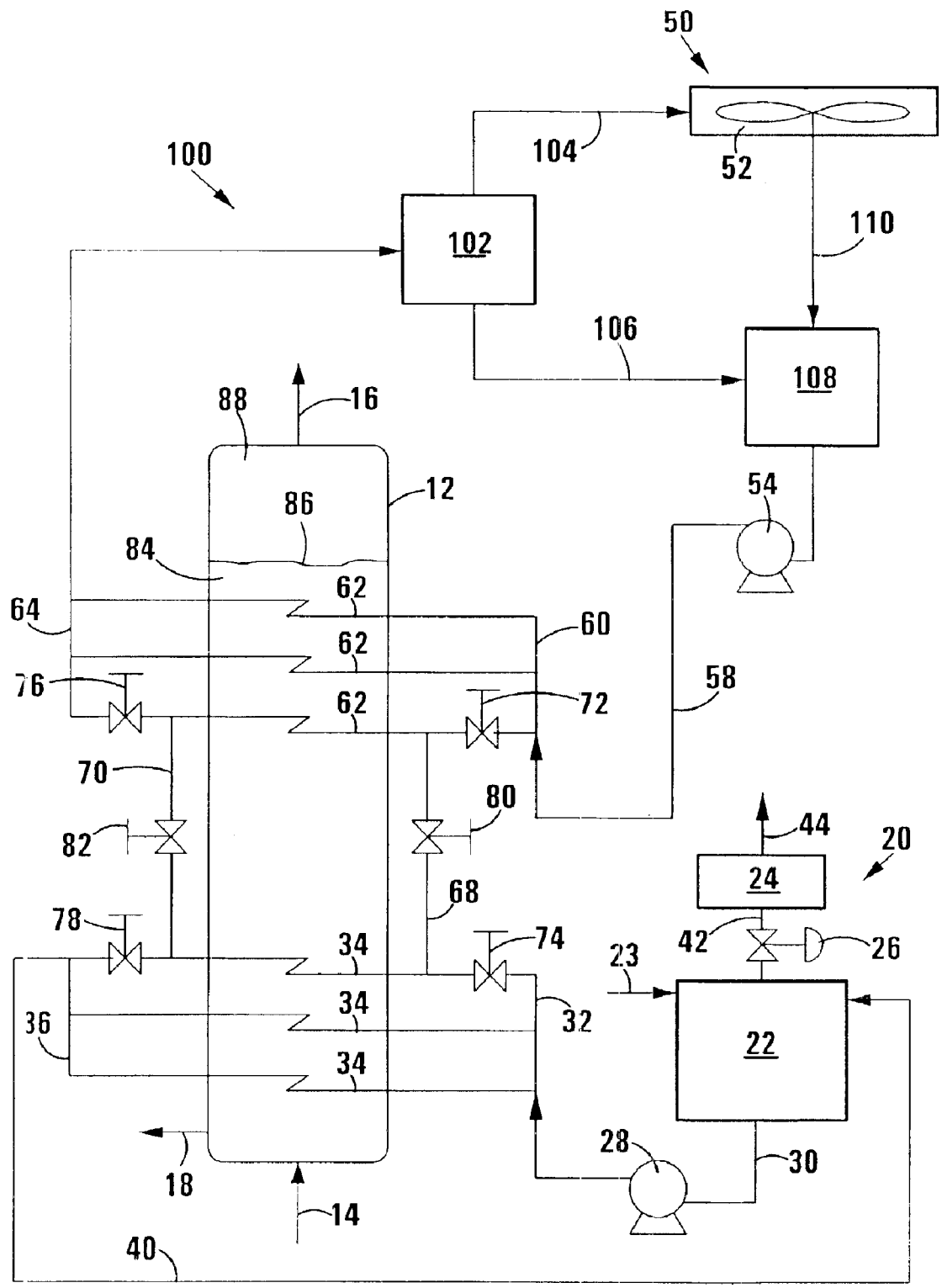
FIG. 2 shows schematically another embodiment of an installation in accordance with the invention for producing liquid and, optionally, gaseous products from gaseous reactants.

Referring to FIG. 2 of the drawings, reference numeral 100 generally indicates another embodiment of an installation in accordance with the invention for producing liquid and gaseous products from gaseous reactants. Parts or features of the installation 100 which are the same as or similar to those of the installation 10 of FIG. 1, are indicated with the same reference numerals.

The installation 100 is very similar to the installation 10, but a major difference is the fact that the second cooling arrangement 50 of the installation 100 is a steam producing cooling arrangement. Thus, the closed cooling arrangement 50 is operated at a pressure such that, in the cooling pipes 62, the water is evaporated to form a mixture of steam and water, which is fed to a steam drum 102 where the mixture separates into steam and water. The steam is then transferred by means of a steam line 104 to the air cooler 52, whereas the water is removed by means of a flow line 106 to a condensate tank 108. In the air cooler 52, the steam is condensed and the condensate is removed to the condensate tank 108 by means of a flow line 110.

The operating pressure of the second cooling arrangement 50 of the installation 100 is substantially lower than the operating pressure of the first cooling arrangement 20 of the installation 100. This ensures that the temperature of the boiler quality water entering the cooling pipes 62 is also lower than the temperature of the boiler water entering the cooling pipes 34, as is the case with the installation 10.

By allowing steam to be formed in the second cooling arrangement 50, the piping can be designed with a much lower pressure rating than in the case of the installation 10, where steam is not allowed to form. However, as shown in FIG. 2, the second cooling arrangement 50 then requires a steam drum 102 and a condensate tank 108.

The installation 10, 100, as illustrated, decreases the cost of heat removal equipment, compared to the prior art and improves reactor temperature control. Higher pressure steam can be produced, at a more constant pressure. As a result of the pressure of the steam being higher, the cost of using the steam for process heating and the driving of steam turbines is reduced.

The quantity of steam produced is less than for the conventional installation of which the applicant is aware. However, the steam that is produced is of a higher pressure, and the decrease in steam production is often advantageous because excess steam must often be condensed because there are not sufficient users for the steam that is generated.

What is claimed is:

1. A process for producing liquid and, optionally gaseous products from gaseous reactants, which process includes feeding, at a low level, gaseous reactants into a slurry bed of solid particles suspended in a suspension liquid;

allowing the gaseous reactants to react as they pass upwardly through the slurry bed, thereby to form liquid and, optionally, gaseous products;

withdrawing any gaseous product and unreacted gaseous reactants from a head space above the slurry bed;

withdrawing liquid product and/or slurry from the slurry bed to maintain the slurry bed at a desired level;

passing boiler water, as a first heat transfer fluid, in indirect heat exchange relationship through the slurry bed to remove heat from the slurry bed;

allowing the heated boiler water to flash and separate to form pressurised steam;

controlling the pressure of the steam to be substantially constant; and passing a second heat transfer fluid in indirect heat exchange relationship through the slurry bed to remove heat from the slurry bed, wherein the average temperature of the second heat transfer fluid in indirect heat exchange relationship with the slurry bed being lower than the average temperature of the boiler water in indirect heat exchange relationship with the slurry bed.

2. A process as claimed in claim 1, in which the first heat transfer fluid, which is boiler water, removes at least 50% of the total heat removed from the slurry bed by the first and second heat transfer fluids.

3. A process as claimed in claim 1, which includes cooling the second heat transfer fluid and returning it for heat exchange duty to the slurry bed, the second heat transfer fluid thus being cycled continuously through the slurry bed, in a substantially closed system.

4. A process as claimed in claim 1, which includes controlling the temperature of the slurry bed by controlling an operating temperature of the second heat transfer fluid passing in indirect heat exchange relationship through the slurry bed.

5. A process as claimed in claim 1, in which the second heat transfer fluid is water, the process including pumping the water to a pressure sufficient substantially to prevent evaporation of the water to form steam at the operating temperature and pressure of the water.

6. A process as claimed in claim 1, in which the second heat transfer fluid is water, the process including allowing steam to be formed by the water.

7. A process as claimed in claim 1, which includes selectively increasing a heat transfer surface area between the second heat transfer fluid and the slurry bed, and decreasing a heat transfer surface area between the first heat transfer fluid and the slurry bed, in order to increase the total heat removal rate achieved by the first and second heat transfer fluids, and/or selectively decreasing a heat transfer surface area between the second heat transfer fluid and the slurry bed, and increasing a heat transfer surface area between the first heat transfer fluid and the slurry bed in order to decrease the total heat removal rate achieved by the first and second heat transfer fluids.

8. A process as claimed in claim 7, which includes switching heat transfer surface area in contact with the first heat transfer fluid and the slurry bed to be in contact with the second heat transfer fluid and the slurry bed, and/or vice versa.

* * * * *